(12) United States Patent
Smith

(10) Patent No.: US 6,732,676 B1
(45) Date of Patent: May 11, 2004

(54) INTEGRATED ANIMAL CRATE AND GROOMING TABLE

(76) Inventor: Douglas C. Smith, 7604 County Road 941, Princeton, TX (US) 75407

( * ) Notice: Subject to any disclaimer, the term of this patent is extended or adjusted under 35 U.S.C. 154(b) by 0 days.

(21) Appl. No.: 10/411,995

(22) Filed: Apr. 11, 2003

(51) Int. Cl.[7] .............................. A01K 1/00; A01K 1/03
(52) U.S. Cl. ........................................................ 119/496
(58) Field of Search ................................. 119/496, 498, 119/499, 500, 482, 453, 416; D30/108

(56) References Cited

U.S. PATENT DOCUMENTS

| | | | | |
|---|---|---|---|---|
| 1,953,900 A | * | 4/1934 | Wolters | 119/426 |
| 2,726,913 A | * | 12/1955 | Freeman | 119/725 |
| 2,902,976 A | * | 9/1959 | Wilson | 119/756 |
| 4,056,078 A | * | 11/1977 | Blafford et al. | 119/671 |
| 4,407,234 A | * | 10/1983 | Kleman | 119/672 |
| 4,505,229 A | * | 3/1985 | Altissimo | 119/668 |
| 4,509,461 A | * | 4/1985 | Peck | 119/753 |
| 4,570,577 A | * | 2/1986 | Bellinger | 119/725 |
| 4,735,173 A | * | 4/1988 | Dubreuil | 119/452 |
| 5,178,098 A | * | 1/1993 | Samberg | 119/756 |
| 5,755,180 A | * | 5/1998 | Smith | 119/72 |
| 5,960,746 A | * | 10/1999 | Salts | 119/756 |
| 6,217,437 B1 | * | 4/2001 | Murray et al. | 119/419 |

* cited by examiner

*Primary Examiner*—Charles T. Jordan
*Assistant Examiner*—Judith A. Nelson
(74) *Attorney, Agent, or Firm*—Michael L. Diaz

(57) ABSTRACT

An integrated pet storage crate and grooming table. The integrated table includes a structure having a pet storage area covered by an openable gate, an equipment storage area for storing equipment, a horizontal surface resting on a top portion of the pet storage area and the equipment storage area, and a grooming surface rotatably connected to the horizontal surface. The grooming surface, which may be optionally covered with a material, covers the equipment storage area in a vertical orientation and is rotated upwardly to a horizontal orientation against the horizontal surface to provide an area for grooming a pet. The structure also includes a plurality of wheels mounted on a bottom surface of the structure allowing mobility of the structure. In addition, a telescopic ramp is mounted under the bottom surface of the structure to facilitate movement of the structure.

18 Claims, 5 Drawing Sheets

INTEGRATED ANIMAL CRATE AND GROOMING TABLE

BACKGROUND OF THE INVENTION

1. Technical Field of the Invention

This invention relates to pet equipment, and more particularly, to an integrated pet crate and grooming table.

2. Description of Related Art

Pet show competitions have increased in popularity over the years. Within these competitions, pets such as dogs and cats, are exhibited. However, in order to properly present these pets for the competitions, various grooming tasks must be accomplished upon the pet. With these grooming tasks, a pet handler must utilize numerous grooming devices. At pet show competitions, it is quite common for the handler to carry several crates of equipment to the competition. For example, a pet crate must be used to transport and house the pet prior to the competition. In addition, the handler must bring a pet grooming table to position the pet upon during the grooming tasks. The grooming table is an elevated table which enables the handler to easily groom the pet. The grooming table normally includes a tethering device to tether the pet from leaving the table. In addition, the handler must bring various items for use during the competition, such as brushes, leashes, and other paraphernalia. Obviously, it is quite cumbersome for the pet handler to bring all these items into the pet show competition. It would be advantageous to have an apparatus which incorporated all the items needed in a pet show competition into one integrated apparatus which is easily transportable.

Although there are no known prior art teachings of an apparatus or system such as that disclosed herein, prior art references that discuss subject matter that bears some relation to matters discussed herein are U.S. Pat. No. 4,509,461 to Peck (Peck), U.S. Pat. No. 5,178,098 to Samberg (Samberg), U.S. Pat. No. 5,513,598 to Zapparoli (Zapparoli), and U.S. Pat. No. 5,960,746 to Salts (Salts).

Peck discloses a device for transporting show animals. The device includes a means for transporting a caged animal and an area to groom or inspect the animal. However, Peck does not teach or suggest a pet crate to house the animal. In addition, Peck does not teach or suggest a storage area for storing grooming and pet equipment required during the pet show competition. Peck merely discloses a dolly for transporting a pet cage and a table. Peck also suffers from the disadvantage of utilizing a table which is supported by a foldable support element which does not provide stability for the grooming of larger animals.

Samberg discloses a dog grooming stand which includes two vertically adjustable rods mounted opposite each other on a grooming table. Each rod provides a pair of eye-hooks extending inwardly and spaced apart by a specified distance. A collar adapted to fit about the dog's neck is provided and suspended between the two vertical rods by four straps. However, Samberg does not teach or suggest a pet crate or any component to easily transport the apparatus. Samberg merely discloses a dog grooming table with a restraint device.

Zapparoli discloses a grooming cabinet for pets. The grooming cabinet includes a blower and an electric motor. However, Zapparoli does not teach or suggest an area for housing the pet. Zapparoli merely discloses a grooming table for use by a pet groomer.

Salts discloses a rigid dog grooming restraint for securing dogs in a stationary position while performing grooming operations. Salts also does not teach or suggest an area to house an animal. In addition, Salts does not teach or suggest a mobile transportation device and does not include an area for storing a grooming equipment.

Review of the foregoing references reveals no disclosure or suggestion of an integrated mobile pet crate and grooming table having a storage area. It is an object of the present invention to provide such an apparatus.

SUMMARY OF THE INVENTION

In one aspect, the present invention is an integrated pet apparatus for grooming and holding a pet. The apparatus includes a structure having a pet storage area. The pet storage area includes an opening covered by an openable cover. The structure also includes an equipment storage area for storing equipment and a horizontal surface resting on a top portion of the pet storage area and the equipment storage area. The structure also includes a rotatable grooming surface. The grooming surface covers the equipment storage area in a down position and is rotated upwardly to a horizontal position against the horizontal surface to provide an area for grooming a pet.

In another aspect, the present invention is an integrated pet apparatus for grooming and holding a pet. The apparatus includes a structure having a pet storage area. The pet storage area has an opening covered by an openable grating. The structure also includes an equipment storage area for storing equipment and a horizontal surface resting on a top portion of the pet storage area and the equipment storage area. In addition, a plurality of wheels are mounted on a bottom surface of the structure allowing mobility of the structure. One or more telescopic ramps are also mounted under the bottom surface of the structure. The structure, in addition, includes a grooming surface rotatably connected to the horizontal surface. The rotatable grooming surface covers the equipment storage area in a vertical orientation and is rotated upwardly to a horizontal orientation against the horizontal surface to provide an area for grooming a pet.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
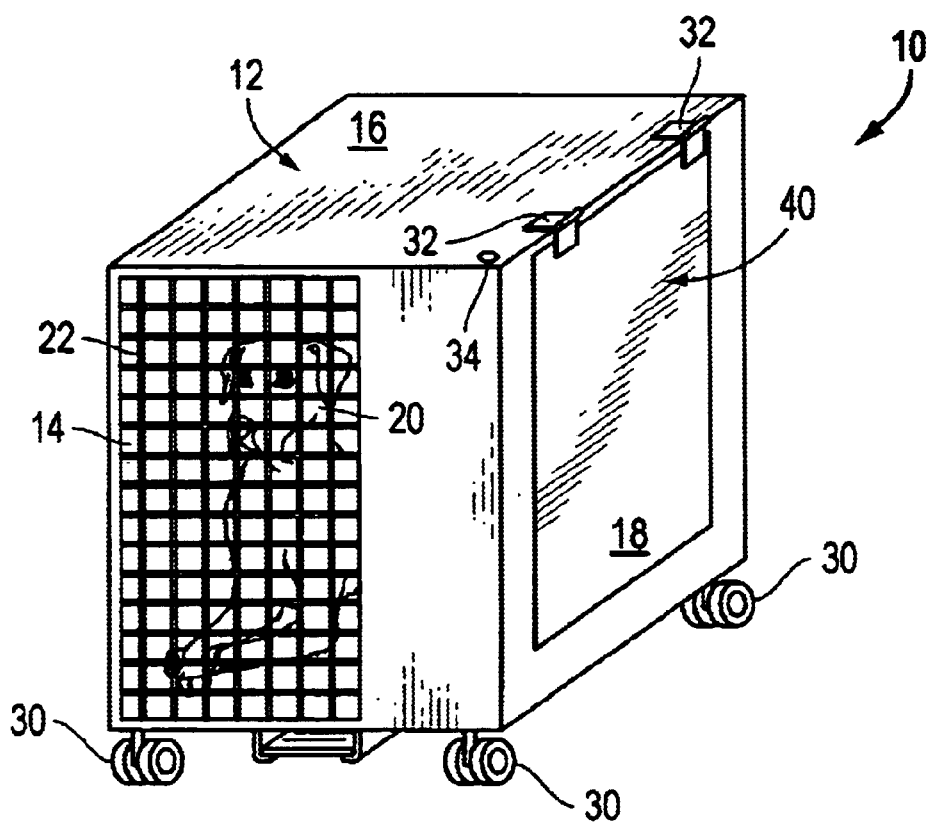
FIG. 1 is a front perspective view of a mobile integrated grooming table in the preferred embodiment of the present invention.

An integrated mobile pet crate and grooming table is disclosed. FIG. 1 is a front perspective view of a mobile integrated grooming table 10 in the preferred embodiment of the present invention. The grooming table includes a structure 12 having a pet holding area 14, a horizontal surface 16 and a rotatable grooming surface 18. The pet holding area is a storage space within the structure 12 which may be used to transport or house a pet 20. Preferably, the pet holding area includes an openable grating 22 covering an opening 24, which allows the pet to view out the storage area and provides appropriate ventilation to the pet.

The mobile integrated grooming table 10 includes a plurality of wheels 30 enabling the grooming table to be easily transported. In the preferred emobidment of the present invention, a pair of swivelable wheels and a pair of non-swivelable, brake-able wheels (brakes for fixing rotation of the wheels) are utilized, however, the grooming table may incorporate any device or devices which enables the grooming table to be easily transportable.

Figure 3:
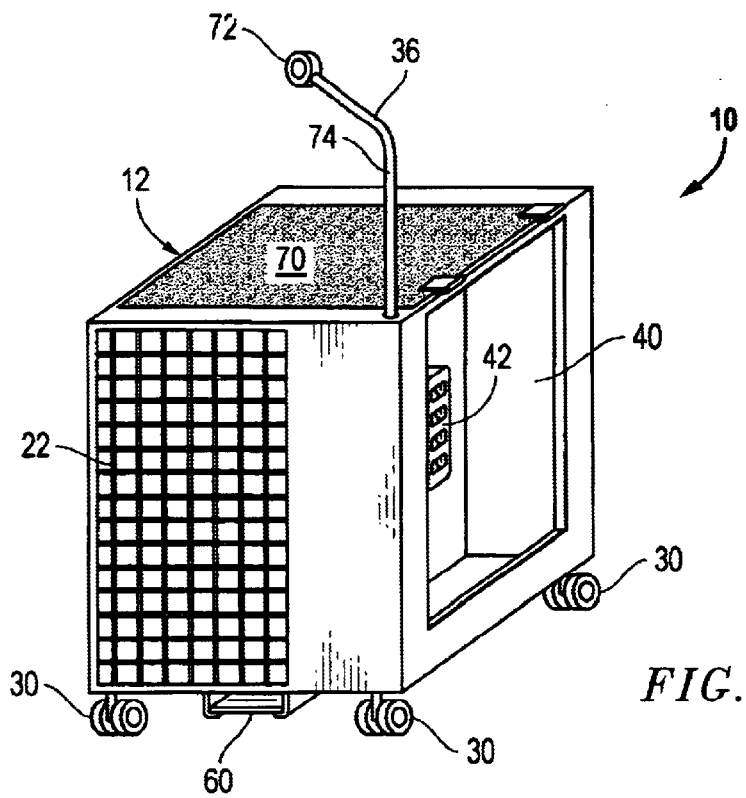
FIG. 3 is a front perspective view of the mobile integrated grooming table of FIG. 1 with the rotatable grooming surface fully raised to a horizontal position.

The grooming surface 18 is rotatable from a closed position (shown in FIG. 1) to an open position horizontal position (FIG. 3). The grooming surface is attached to the horizontal surface by one or more 270 degree hinges 32. The grooming surface, while in the closed position illustrated in FIG. 1, covers an equipment storage area 40. The equipment storage area covers a storage space for holding equipment used by the handler.

The structure 12 may be configured in any shape which includes the pet holding area (an area for a pet to be stored), the equipment storage area (an area for storing equipment), the rotatable grooming surface (covering the equipment storage area and providing a surface for grooming the pet), and a horizontal surface (providing support for the groom surface).

The horizontal surface also includes a stanchion receptacle 34 for holding a grooming stanchion 36 in a vertical position. As illustrated in FIG. 1, the restraint rod is removed from the receptacle.

Figure 2:
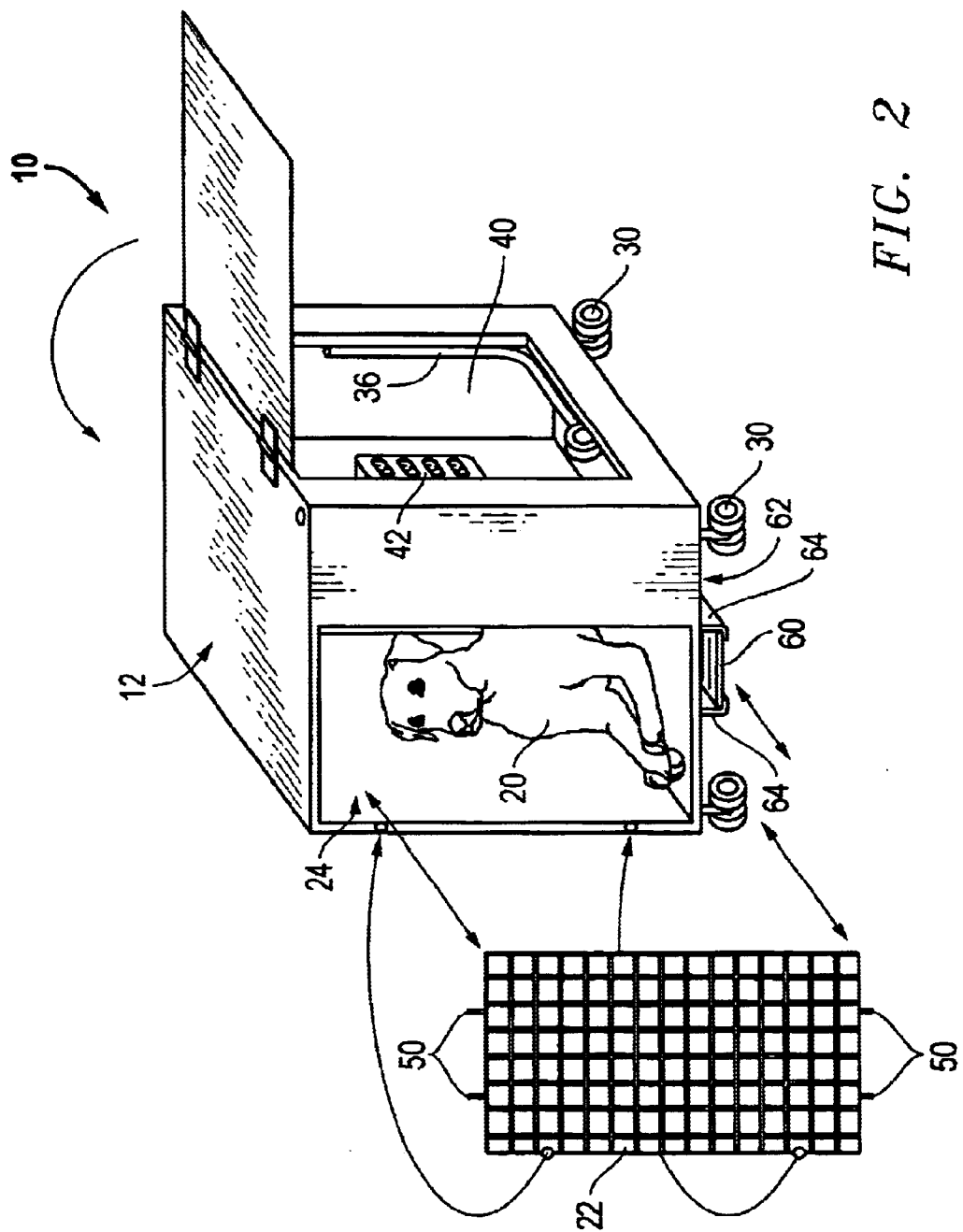
FIG. 2 is a front perspective view of the mobile integrated grooming table of FIG. 1 with the rotatable grooming surface partially raised.

FIG. 2 is a front perspective view of the mobile integrated grooming table 10 of FIG. 1 with the rotatable grooming surface 18 partially raised. The grooming surface is partially rotated upwardly to reveal the equipment storage area 40. The equipment storage area may store any device used by a pet handler/groomer, such as grooming devices (e.g., brushes and clippers), first aid kit, air blower, lamp, etc. In addition, the storage area may include one or more outlets for attaching electrical devices. In one embodiment of the present invention, the storage area includes an outlet strip 42. The outlet strip may be connected to an electric cable running to an external electric outlet (not shown). Alternatively, the storage area may include a multi-plug extension cord retained in one or more cleats. In addition, the storage area may store the grooming stanchion 36.

FIG. 2 also illustrates the grating 22 removed from the pet holding area 14. The grating may include restraining elements 50 which are commonly used to hold the grating in a vertical position on a pet crate. Alternatively, the grating may be hinged in a gate-like fashion, thereby allowing the grating to pivot outwardly along a perimeter of the grating.

The grooming table also includes one or more telescopic ramps 60 stored underneath a bottom surface 62 of the structure 12. The telescopic ramp may be stored in any area upon the grooming table but preferably is stored in an unobtrusive area, such as the bottom surface of the structure or a vertical surface. As illustrated, the telescopic ramp is held in place within a pair of mounting elements 64.

FIG. 3 is a front perspective view of the mobile integrated grooming table 10 of FIG. 1 with the rotatable grooming surface 18 fully raised to the horizontal position. As illustrated in FIG. 3, the grooming surface is rotated 270 degrees to a horizontal position resting upon the horizontal surface 16. By resting the grooming surface upon the horizontal surface, the grooming surface is fully supported by the entire structure 12, thus providing ample stability and support to the grooming surface. The grooming surface preferably includes an overlaid material 70, such as a padded carpeted, nonskid, or textile surface. The overlaid material is where the pet is preferably positioned during the grooming process.

The grooming stanchion 36 may be vertically positioned within the stanchion receptacle 34. The grooming stanchion may include an eye-hook 72 on a servicing end of the stanchion to tether the pet. Additionally, the stanchion may be configured in such a manner as to extend outwardly from a vertical section 74. The pet 20 may be positioned on the grooming surface 18 and tethered by a leash and collar or other holding device attached to the end of the stanchion.

Figure 4:
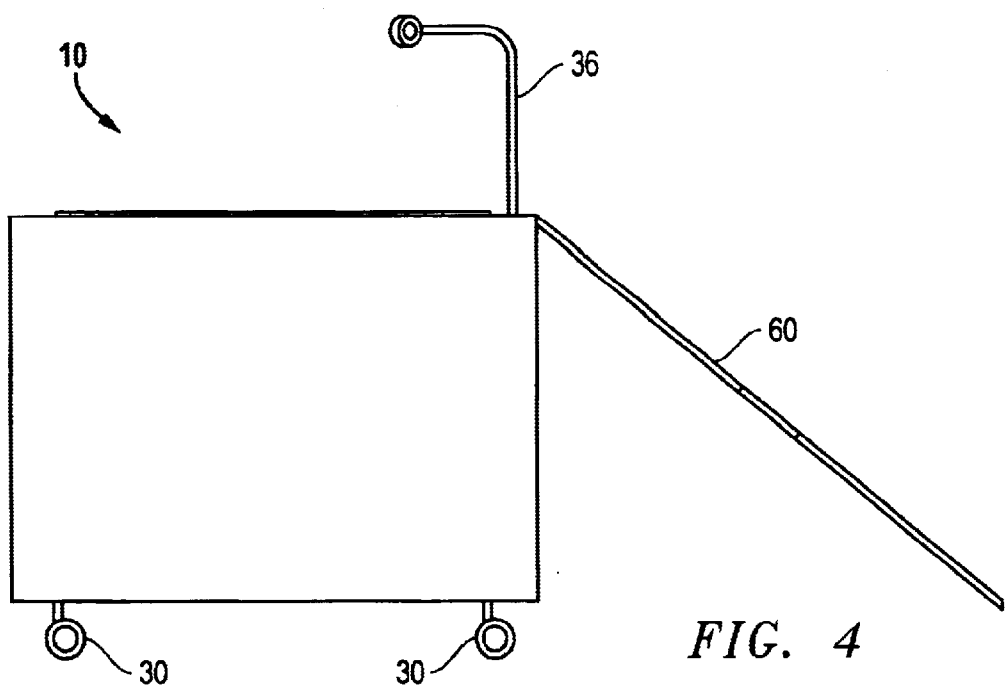
FIG. 4 is a side view of the integrated grooming table with the telescopic ramp positioned along a side portion of the grooming table.

FIG. 4 is a side view of the integrated grooming table 10 with the telescopic ramp 60 positioned along a side portion of the grooming table. The telescopic ramp may be extended out and positioned against the grooming table to enable a pet to walk up the ramp onto the grooming surface. If the handler cannot pick up the pet, the ramp enables the pet to be easily positioned on the raised grooming surface.

Figure 5:
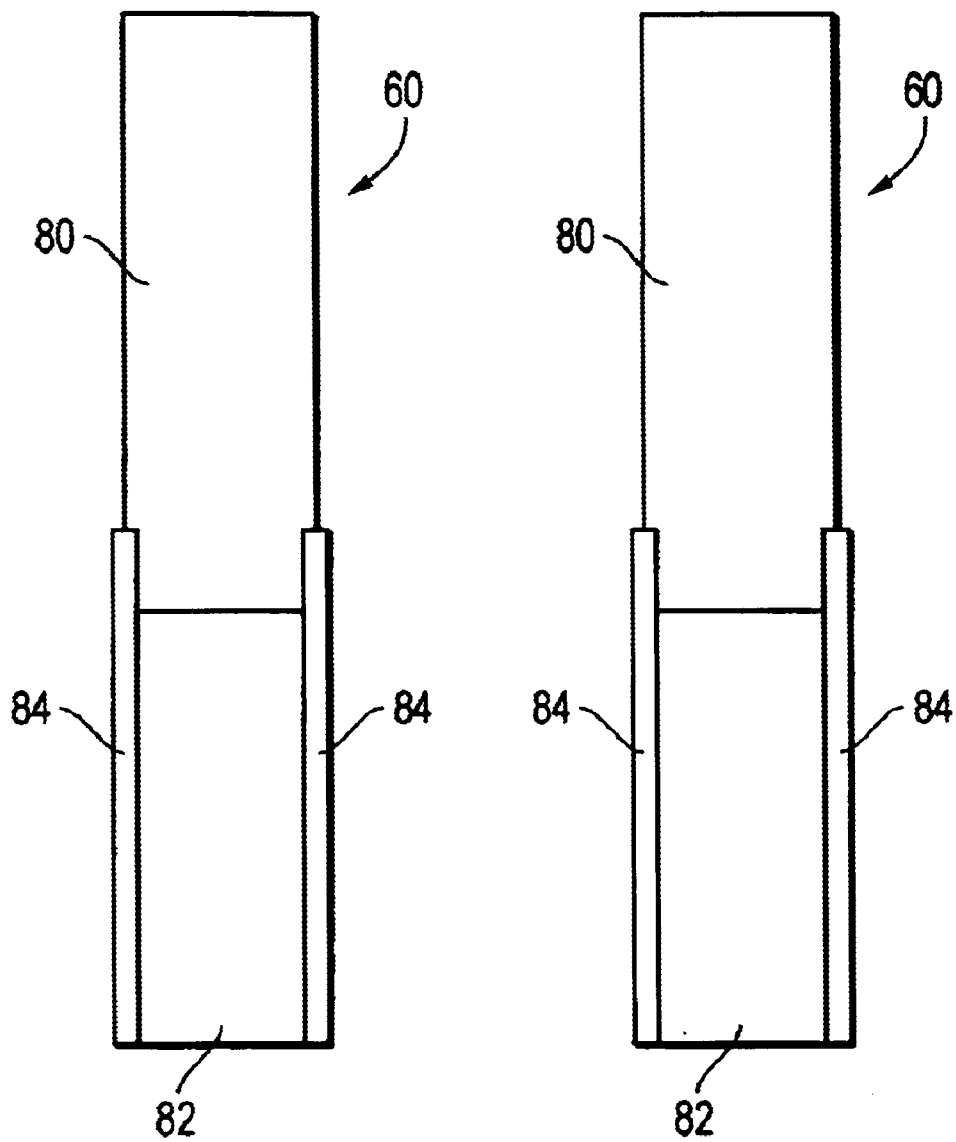
FIG. 5 is a top elevational view of two telescopic ramps.

The telescopic ramp preferably comprises two or more segments which are extendable as necessary. FIG. 5 is a top elevational view of two telescopic ramps 60. Each ramp is extendable by utilizing two or more segments 80 and 82. Preferably, the first segment 80 is configured to slidably attach to the second segment 82. As depicted, the segment 80 is slid within railings 84. Preferably, each ramp is positioned to allow a set of tandemly positioned wheels to be rolled upon each ramp. It should be understood that the ramp may include more than two segments. Alternatively, the ramp may be only one segment which is not extendable.

Figure 6:
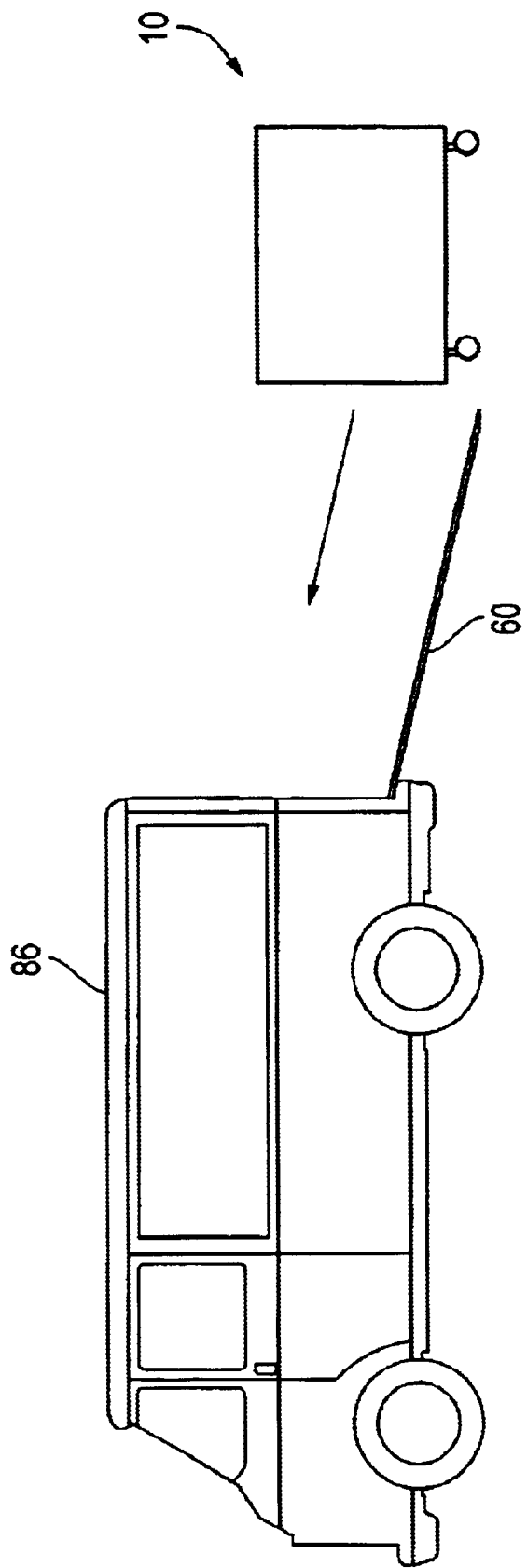
FIG. 6 is a side view of the integrated mobile table and the telescopic ramp positioned against a vehicle.

FIG. 6 is a side view of the integrated mobile table 10 and the telescopic ramp 60 positioned against a vehicle 86. The telescopic ramp may also be used for transporting the grooming table into a vehicle. Through the use of two ramps, each ramp is positioned against an opening within the vehicle. Each set of tandemly oriented wheels is aligned by each ramp. The grooming table may then be rolled into the vehicle, with each set of wheels being rolled onto the appropriate ramp.

With reference to FIGS. 1–6, the operation of the integrated grooming table 10 will now be explained. The pet 20 may be placed in the pet holding area 14. The openable grating is inserted (closed) over the opening 24 of the pet holding area. In addition, any equipment necessary for use by the handler may be stored within the structure 12, with most equipment being placed in the equipment storage area 40. With the pet in the integrated grooming table, all of the equipment, as well as the pet are easily transportable to and from various locations.

During transportation of the integrated grooming table 10 or when the grooming table is not in use, the rotatable grooming surface 18 is preferably position in the down position, thus covering the equipment storage area 40. The grooming surface may include a lock to secure the grooming surface in the closed configuration. In the closed configuration, the equipment remains confined within the equipment storage area.

To transport the integrated grooming table 10, the wheels provide mobility to the grooming table. The grooming table may be wheeled along a surface to a desired location. To facilitate the movement of the grooming table along a raised/lowered surface, the telescopic ramp 60 may be utilized. The telescopic ramp is preferably stored under the bottom surface 62 of the structure 12. When the telescopic ramp is needed, the ramp is slid out of its mounting elements 64. The telescopic ramp is telescopically extended to the desired length and positioned against the elevated or lowered surface. The grooming table may then be wheeled up or down the ramps to the desired position. The ramp is particularly useful when positioning the grooming table into or out of a vehicle.

Once the integrated grooming table is in position, the grooming table may be configured for use. Two or more of the wheels may be optionally locked to prevent movement of the grooming table. The rotatable grooming surface is rotated 270 degrees to a horizontal position, resting against the horizontal surface 16. With the grooming surface raised to the open configuration, the equipment storage area 40 is opened, allowing access to the equipment stored in the storage area. The grooming stanchion 36 may be vertically positioned within the stanchion receptacle 34. Additionally, an electric cable connected to the outlet strip 42 may be plugged into an external outlet (not shown), to provide electric power as desired by the handler. Alternatively, a multi-plug extension cord may be utilized.

The pet 20 may be removed from the pet holding area 14 by removing (or unlatching) the grating 22 from the opening 24. If necessary, the telescopic ramp 60 may be utilized as a ramp leading to the horizontally positioned grooming surface 18. The pet may be tethered by a. leash and collar attached to the eye hook 72, thus allowing the handler to easily groom the pet.

When grooming is complete, the equipment may again be stored within the equipment storage area 40. The grooming surface may be rotated back 270 degrees to the vertical (closed) position. The pet may be stored within the pet holding area 14 with the grating 22 covering the opening 24. If necessary, the wheels may be removed from the structure 12, thus enabling the grooming table to be transported via aircraft. Airline carrier regulations currently require the removal of any wheels from a package containing animals prior to transportation.

The present invention provides many advantages over existing devices. The integrated grooming table provides a storage area for both the handler's equipment and the pet. In addition, the integrated grooming table includes a rotatable grooming table which provides a covering for the equipment storage area as well as a grooming surface for grooming the pet. Since the grooming surface rests against the solidly supported horizontal surface, the grooming surface is stable and fully supported, even for larger animals. The integrated grooming table also includes a removable stanchion for tethering the pet on the grooming surface. Additionally, the integrated grooming table is mobile, allowing transportation by wheeling the table (with the brakes released) to a desired location. The transportation of the grooming table is facilitated by the use of one or more telescopic ramps.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. An integrated pet apparatus for grooming and holding a pet, said apparatus comprising:
    a structure having:
        a pet storage area, said pet storage area having an opening covered by an openable cover;
        an equipment storage area for storing equipment;
        a horizontal surface resting on a top portion of said pet storage area and said equipment storage area; and
        a rotatable grooming surface, whereby said rotatable grooming surface covers said equipment storage area in a down position and is rotated upwardly to a horizontal position against the horizontal surface to provide an area for grooming a pet.

2. The integrated pet apparatus for grooming and holding a pet of claim 1 wherein said rotatable grooming surface is rotatably affixed to said horizontal surface.

3. The integrated pet apparatus for grooming and holding a pet of claim 2 wherein said rotatable grooming surface is affixed to said horizontal surface by at least one hinge allowing said grooming surface to rotate 270 degrees from a vertical orientation to a horizontal orientation.

4. The integrated pet apparatus for grooming and holding a pet of claim 1 wherein said rotatable grooming surface includes a material covering a portion of said grooming surface.

5. The integrated pet apparatus for grooming and holding a pet of claim 1 wherein said storage area includes a multi-plug extension cord adapted for providing electric power for equipment stored within the integrated pet apparatus.

6. The integrated pet apparatus for grooming and holding a pet of claim 1 wherein said structure is mounted on a plurality of swivelable wheels, the plurality of wheels allowing movement of the structure.

7. The integrated pet apparatus for grooming and holding a pet of claim 6 wherein at least two wheels include brakes for preventing rotation of the wheels.

8. The integrated pet apparatus for grooming and holding a pet of claim 1 further comprising a ramp facilitating transportation of the structure and stored on said structure.

9. The integrated pet apparatus for grooming and holding a pet of claim 1 further comprising at least two ramps facilitating transportation of the structure and stored on said structure.

10. The integrated pet apparatus for grooming and holding a pet of claim 8 wherein said ramp includes telescopically connected segments.

11. The integrated pet apparatus for grooming and holding a pet of claim 8 wherein the ramp is stored under a bottom surface of said structure.

12. The integrated pet apparatus for grooming and holding a pet of claim 8 wherein the ramp is stored upon a side surface of said structure.

13. The integrated pet apparatus for grooming and holding a pet of claim 1 further comprising a removable stanchion mounted on said horizontal surface for tethering a pet on said grooming surface.

14. The integrated pet apparatus for grooming and holding a pet of claim 1 wherein the cover is a gate hinged to said structure.

15. The integrated pet apparatus for grooming and holding a pet of claim 1 wherein the cover is removable from said structure.

16. An integrated pet apparatus for grooming and holding a pet, said apparatus comprising:
    a structure having:

a pet storage area, said pet storage area having an opening covered by an openable gate;

an equipment storage area for storing equipment;

a horizontal surface resting on a top portion of said pet storage area and said equipment storage area;

a plurality of wheels mounted on a bottom surface of said structure allowing mobility of said structure;

at least two telescopic ramps mounted under the bottom surface of the structure; and a grooming surface rotatably connected to said horizontal surface, whereby said rotatable grooming surface covers the equipment storage area in a vertical orientation and is rotated upwardly to a horizontal orientation against the horizontal surface to provide an area for grooming a pet.

17. The integrated pet apparatus for grooming and holding a pet of claim 16 further comprising a removable stanchion mounted on said horizontal surface for tethering a pet on said grooming surface.

18. An integrated pet apparatus for grooming and holding a pet, said apparatus comprising:

a structure having:

a pet storage area, said pet storage area having an opening covered by an openable grating;

an equipment storage area for storing equipment positioned adjacent said pet storage area;

a horizontal surface resting on a top portion of said pet storage area and said equipment storage area;

a plurality of swivelable wheels mounted on a bottom surface of said structure allowing mobility of said structure;

a telescopic ramp mounted under the bottom surface of the structure, said telescopic ramp facilitating transportation of said structure;

a removable stanchion mounted on said horizontal surface for tethering a pet on said grooming surface; and a rotatable grooming surface connected to said horizontal surface by at least one hinge, whereby said rotatable grooming surface covers the equipment storage area in a vertical orientation and is rotated upwardly to a horizontal orientation against the horizontal surface to provide an area for grooming a pet.

* * * * *